United States Patent
Liao et al.

(10) Patent No.: US 11,768,596 B1
(45) Date of Patent: Sep. 26, 2023

(54) USER INTERFACE SYNCHRONOUS SCROLLING SYSTEM AND USER INTERFACE SYNCHRONOUS SCROLLING METHOD

(71) Applicant: Wistron Corp., New Taipei (TW)

(72) Inventors: Fang-Wen Liao, New Taipei (TW); Yu-Ping Lin, New Taipei (TW); Hsin Ting Ho, New Taipei (TW); Ming Jen Chan, New Taipei (TW); Li-Yu Yang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/977,951

(22) Filed: Oct. 31, 2022

(30) Foreign Application Priority Data

Jun. 13, 2022 (TW) .................................. 111121780

(51) Int. Cl.
| | | |
|---|---|---|
| *G06F 3/04855* | (2022.01) | |
| *G06F 3/04847* | (2022.01) | |
| *G06F 3/0362* | (2013.01) | |
| *G06F 3/038* | (2013.01) | |
| *G06F 3/0354* | (2013.01) | |
| *G06F 3/0482* | (2013.01) | |

(52) U.S. Cl.
CPC .......... *G06F 3/04855* (2013.01); *G06F 3/038* (2013.01); *G06F 3/0362* (2013.01); *G06F 3/03543* (2013.01); *G06F 3/0482* (2013.01); *G06F 3/04847* (2013.01)

(58) Field of Classification Search
CPC ............ G06F 3/04855; G06F 3/03543; G06F 3/0362; G06F 3/038; G06F 3/0482; G06F 3/04847
See application file for complete search history.

(56) References Cited

U.S. PATENT DOCUMENTS

| | | | | |
|---|---|---|---|---|
| 2005/0160360 | A1* | 7/2005 | Nadamoto | G06F 16/954 715/264 |
| 2007/0136677 | A1* | 6/2007 | Agarwal | G06F 3/0481 715/767 |
| 2008/0052636 | A1* | 2/2008 | Abe | G06F 3/0485 715/786 |
| 2009/0150822 | A1* | 6/2009 | Miller | G06F 3/0485 715/784 |
| 2014/0059411 | A1* | 2/2014 | Or-Bach | G06F 40/103 715/201 |
| 2015/0035998 | A1* | 2/2015 | Mathew | H04N 7/141 348/207.1 |
| 2020/0356253 | A1* | 11/2020 | Yoshimoto | H04N 1/00432 |

FOREIGN PATENT DOCUMENTS

CN 112199301 A 1/2021

\* cited by examiner

*Primary Examiner* — Jonathan A Boyd

(57) ABSTRACT

A user interface synchronous scrolling method includes: opening a plurality of user interfaces, obtaining a scrolling parameter through the input-output interface; and judging whether the application program corresponding to each user interface belongs to a software support mode. By determining whether the application program corresponding to each user interface belongs to the software support mode, and providing corresponding control steps, the effect of synchronous scrolling for multiple user interfaces is achieved.

16 Claims, 8 Drawing Sheets

USER INTERFACE SYNCHRONOUS SCROLLING SYSTEM AND USER INTERFACE SYNCHRONOUS SCROLLING METHOD

CROSS REFERENCE TO RELATED APPLICATIONS

This Application claims priority of Taiwan Patent Application No. 111121780, filed on Jun. 13, 2022, the entirety of which is incorporated by reference herein.

BACKGROUND OF THE INVENTION

Field of the Invention

The present disclosure relates to a multi-window synchronous scrolling system and, in particular, to a user interface synchronous scrolling system and a user interface synchronous scrolling method.

Description of the Related Art

When a user opens a plurality of application programs, each of these application programs has a user interface to provide the user for editing. For example, Microsoft Office's Word, PowerPoint, or portable document format (PDF).

Sometimes users need to open the same application program but different files to compare versions, such as opening two Word files to compare the differences in text content, or opening different application programs to refer to each other, such as opening a PDF file and a PowerPoint file to compare the content of the PDF with the content of the PowerPoint file.

However, there is currently no general synchronous scrolling user interface method, and synchronous scrolling cannot be performed on general files or across different file formats. When opening the user interfaces or windows of multiple application programs, the user often needs to drag the scroll bar of the user interface or window to a position, and then drag another scroll bar of the user interface or window to a corresponding position, in order to compare the two files, which is very inconvenient for users.

Therefore, how to devise a method for synchronous scrolling for multiple user interfaces has become one of the problems to be solved in the art.

BRIEF SUMMARY OF THE INVENTION

In accordance with one feature of the present disclosure, the present disclosure provides a user interface synchronous scrolling system. The user interface synchronous scrolling system includes a processor, an input-output interface and a storage device. The processor is used for accessing a synchronous scrolling program stored in the storage device to execute the synchronous scrolling program, wherein the processor executes the following steps: opening a plurality of user interfaces; obtaining a scrolling parameter through the input-output interface; and determining whether each application program corresponding to the user interface belongs to a software support mode. in response to the processor determining that the application program belongs to the software support mode, the processor finds a window object belong to AutomationElement Class corresponding to the user interface according to a handle corresponding to the user interface, according to the window object finds a control component, sets the control component of the user interface as a synchronous scrolling value according to the scrolling parameter. In response to the processor determining that the application program does not belong to the software support mode, the processor obtains scroll bar information (ScrollBarInfo) of the user interface according to the handle corresponding to the user interface, and sets the scroll bar information as the synchronous scrolling value according to the scrolling parameter.

In accordance with one feature of the present disclosure, the present disclosure provides a user interface synchronous scrolling method. The user interface synchronous scrolling method is for accessing a synchronous scrolling program stored in a storage device to execute the synchronous scrolling program by a processor. The user interface synchronous scrolling method includes following steps: opening a plurality of user interfaces; obtaining a scrolling parameter through an input-output interface; and determining whether each application program corresponding to the user interface belongs to a software support mode. In response to the processor determining that the application program belongs to the software support mode, the processor finds a window object belong to AutomationElement Class corresponding to the user interface according to a handle corresponding to the user interface, according to the window object finds a control component, sets the control component of the user interface as a synchronous scrolling value according to the scrolling parameter. In response to the processor determining that the application program does not belong to the software support mode, the processor obtains the scroll bar information (ScrollBarInfo) of the user interface according to the handle corresponding to the user interface, sets the scroll bar information as the synchronous scrolling value according to the scrolling parameter.

The user interface synchronous scrolling system and user interface synchronous scrolling method described in the invention are applicable to the same type or different types of application programs. The user interface of these application programs can make the content in the window or visual interface scroll synchronously through the user interface synchronous scrolling system and the user interface synchronous scrolling method, so that the user can compare the content more easily. Therefore, the effect of synchronous scrolling is achieved for multiple user interfaces.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, components, and/or components, but do not preclude the presence or addition of one or more other features, integers, steps, operations, components, components, and/or groups thereof Use of ordinal terms such as "first", "second", "third", etc., in the claims to modify a claim component does not by itself connote any priority, precedence, or order of one claim component over another or the temporal order in which acts of a method are performed, but are used merely as labels to distinguish one claim component having a certain name from another component having the same name (but for use of the ordinal term) to distinguish the claim components.

Figure 1:
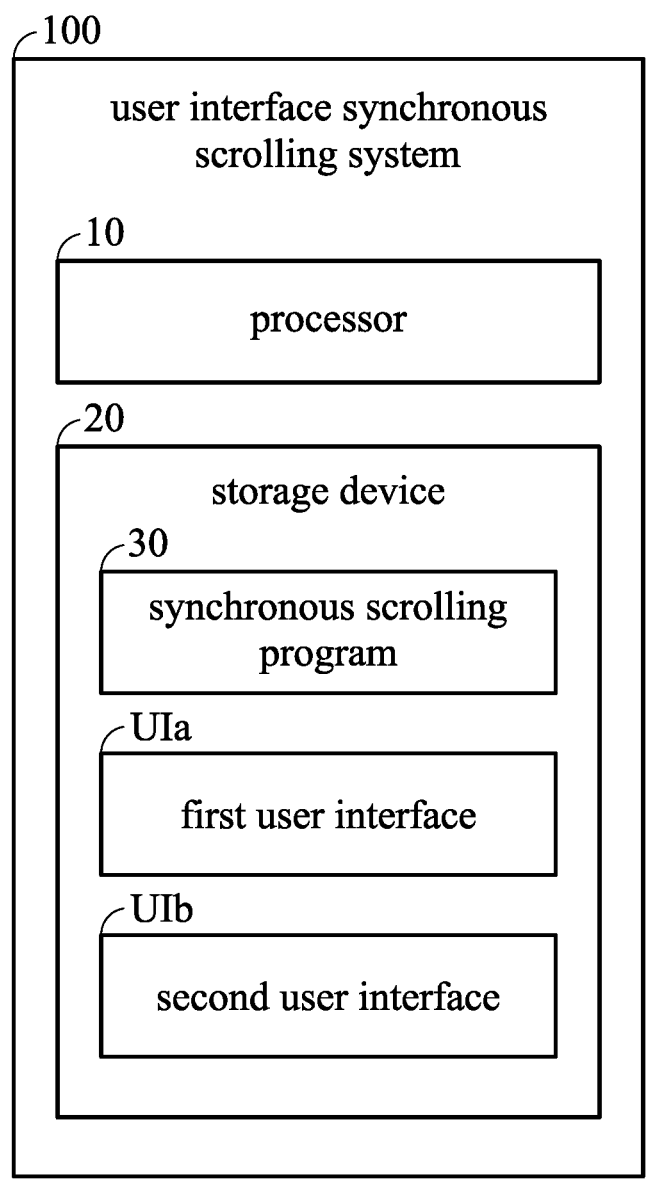
FIG. 1 is a block diagram of a user interface synchronous scrolling system in accordance with one embodiment of the present disclosure.
Figure 2:
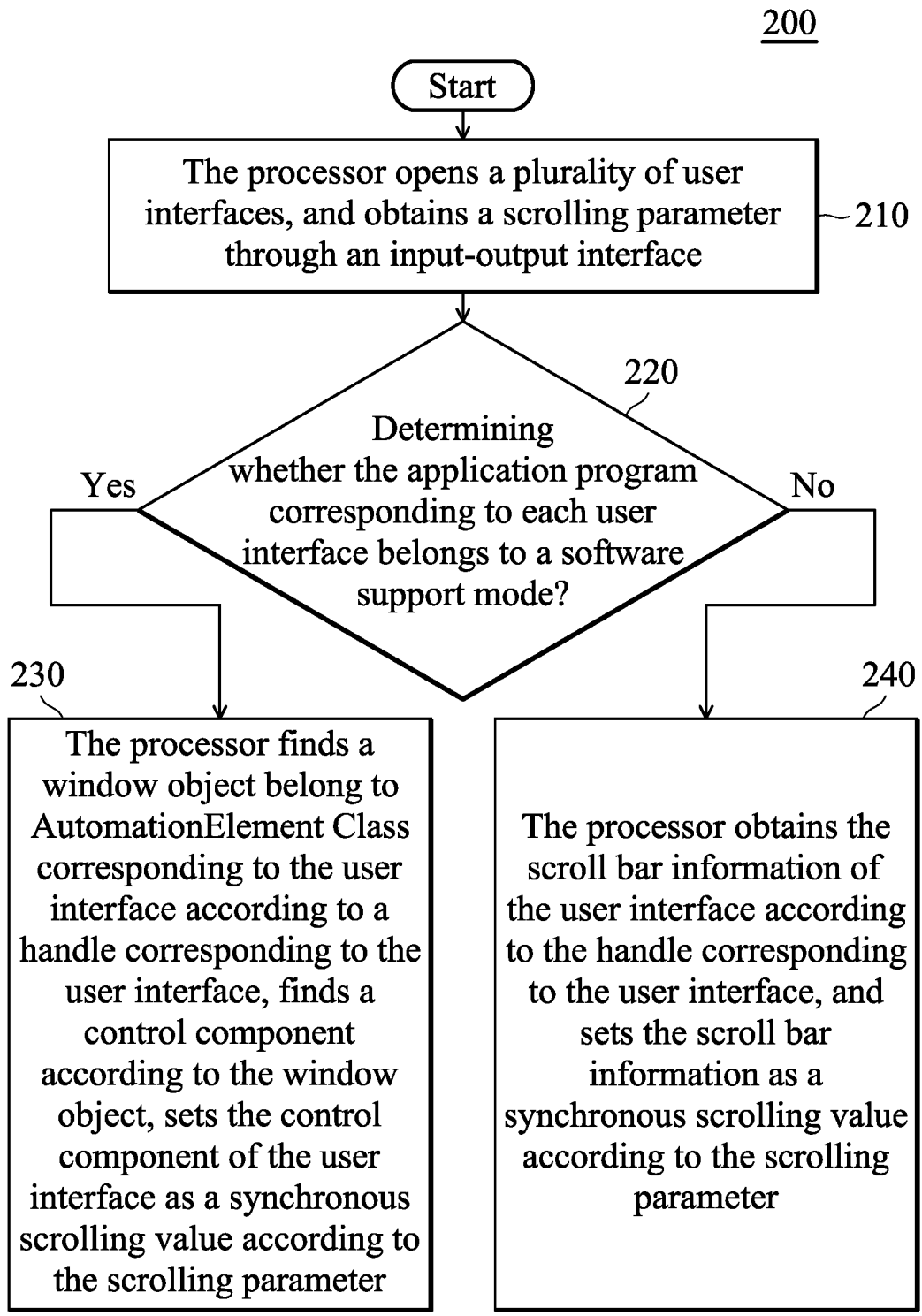
FIG. 2 a flowchart of a user interface synchronous scrolling method 200 in accordance with one embodiment of the present disclosure.

Please refer to FIGS. 1 and 2, FIG. 1 is a block diagram of a user interface synchronous scrolling system 100 in accordance with one embodiment of the present disclosure. FIG. 2 is a flowchart of a user interface synchronous scrolling method 200 in accordance with one embodiment of the present disclosure. In one embodiment, the user interface synchronous scrolling method 200 can be implemented by the user interface synchronous scrolling system 100.

As shown in FIG. 1, the user interface synchronous scrolling system 100 can be a desktop computer, a laptop, or a virtual machine constructed on a host operation system.

In one embodiment, the functions of the user interface synchronous scrolling system 100 can be implemented by hardware circuits, chips, firmware or software.

In one embodiment, the user interface synchronous scrolling system 100 includes a processor 10 and a storage device 20. In one embodiment, the user interface synchronous scrolling system 100 further includes a display.

In one embodiment, processor 10 can be implemented by a microcontroller, a microprocessor, a digital signal processor, an application specific integrated circuit (ASIC) or a logic circuit.

In one embodiment, the storage device 20 can be implemented as ROM, flash memory, floppy disk, hard disk, optical disk, pen drive, magnetic tape, a database accessible over a network, or those skilled in the art can easily conceive of having the same function the storage medium.

In one embodiment, the processor 10 is configured to access the program stored in the storage device 20 to implement the user interface synchronous scrolling method 200.

Figure 6:
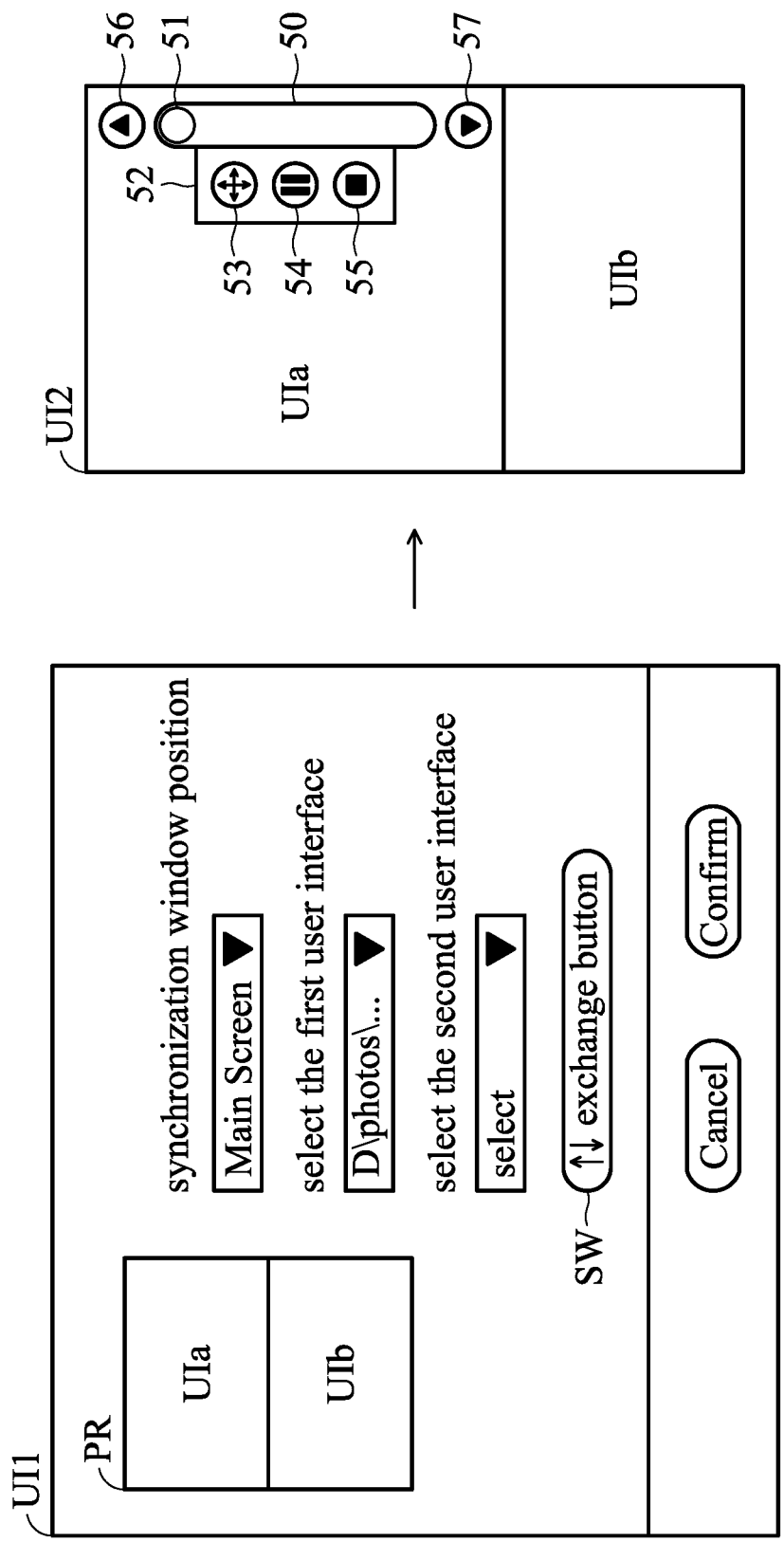
FIG. 6 is a schematic diagram of selecting a scrolling interface method to synchronously scroll two user interfaces in accordance with one embodiment of the present disclosure.

In one embodiment, a synchronous scrolling program 30 stored in the storage device 20 can be implemented by hardware (circuit/chip), software or firmware. In one embodiment, the synchronous scrolling program 30 includes a synchronization interface 32. The function of the synchronization interface 32 can be realized by hardware (circuit/chip), software or firmware, and the synchronization interface 32 can be used to display the adjustment panel 52 (as shown in FIG. 6). In one embodiment, the storage device 20 is used to temporarily store the first user interface UIa and the second user interface UIb, or temporarily store more other user interfaces. The first user interface UIa and the second user interface UIb are, for example, window interfaces that the user currently wants to scroll simultaneously. In one embodiment, the synchronous scrolling program 30 can realize its function by software or firmware, and is stored in the storage device 20, The user interface synchronous scrolling system 100 accesses the synchronous scrolling program 30 stored in the storage device 20 through the processor 10 to realize the functions of the user interface synchronous scrolling system 100. The following describes the user interface synchronous scrolling method 200. The processor 10 is used for accessing a synchronous scrolling program 30 stored in the storage device 20 to execute the synchronous scrolling program 30. The processor 10 performs the following steps.

In step 210, the processor 10 opens a plurality of user interfaces, and obtains a scrolling parameter through an input-output interface.

In one embodiment, the processor 10 opens a user interface of an application program.

In one embodiment, the application program is, for example, built-in open software for PDF, and the user interface is, for example, a PDF window.

In one embodiment, the application program is, for example, Microsoft Word, and the user interface is, for example, a window of Word.

In one embodiment, the processor 10 can use the scrolling value of the mouse wheel or a synchronization button (such as the move position button 53 in FIG. 6 (for starting the synchronous scrolling function), the scroll up button 56, the scroll down button 57, pause/start synchronization button 54 or end synchronization button 55) to get the scrolling parameter.

In step 220, the processor 10 determines whether the application program corresponding to each user interface belongs to a software support mode.

In one embodiment, the processor 10 determines whether the application program belongs to a software support mode. That is, the processor 10 determines whether the application program has a component belong to the AutomationElement Class. In response to the processor 10 determining that the application program belongs to the software support mode, step 230 is performed. In response to the processor 10 determining that the application program does not belong to the software support mode, step 240 is performed.

In one embodiment, the processor 10 determines whether the application program belongs to the software support mode, which refers to determining whether the application program is a Microsoft office package, for example, Word, PowerPoint . . . etc. The application program here refers to the current application program, that is, the application program that the user is operating. However, the invention is not limited thereto, as long as the package contains the support AutomationElement Class, it belongs to the software support mode. In one embodiment, AutomationElement Class is a function for representing a UI Automation item in the UI automation tree and containing values that can be used as identifiers by UI Automation client applications.

For example, the built-in open application program of the processor 10 to open the PDF does not belong to the software support mode. In this example, since the built-in open application program of the PDF is not a Microsoft office package and does not support the AutomationElement Class package, the processor 10 then executes step 240.

For another example, the processor 10 starts the application program of the Word file. In this example, since the application program of the Word file belongs to Microsoft's office package, which is a package that supports AutomationElement Class. The processor 10 then executes step 230.

In step 230, the processor 10 finds a window object belong to AutomationElement Class corresponding to a user interface according to a handle corresponding to the user interface, and finds a control component according to the window object, and sets the control component of the user interface to a synchronous scrolling value according to the scrolling parameter. In one embodiment, the processor 10 finds the control component of the user interface through the window object, and the control component is a scroll bar.

In one embodiment, in step 230, the processor 10 uses a function kit (rScrollPattern) to set the scroll value. This value is called synchronous scrolling value, and the synchronous scrolling value corresponds to allow the user interface to perform synchronous scrolling. In one embodiment, the scrolling parameter is a parameter obtained from the input-output interface, and the synchronous scrolling value of the user interface is set according to the scrolling parameter through the function kit. The synchronous scrolling value is scroll position information, scrolling speed information or scrolling distance information corresponding to the user interface.

In step 240, the processor 10 obtains the scroll bar information (ScrollBarInfo) of the user interface according to the handle corresponding to the user interface, and sets the scroll bar information as a synchronous scrolling value according to the scrolling parameter.

In one embodiment, the processor 10 obtains the scroll bar information (ScrollBarInfo) of the user interface, and uses a specified scroll bar position function (SetScrollPos) to set the synchronous scrolling value according to the scroll bar information and the scrolling parameter, so as to allow the user interface to perform synchronous scrolling.

In one embodiment, the processor 10 finds an attribute of the scroll bar of the user interface through the scroll bar of the user interface, and this attribute is used to define a scrolling method (such as upward scrolling speed and/or downward scrolling speed). In one embodiment, the scrolling parameter is a parameter obtained from the input-output interface, and the synchronous scrolling value of the user interface is set according to the scrolling parameter and the scroll bar information through the scroll bar position function. The synchronous scrolling value is scroll position information, scrolling speed information or scrolling distance information corresponding to the user interface.

In one embodiment, in response to the processor 10 determining that the application program cannot obtain the AutomationElement Class of the user interface corresponding to the application program through the operating system, it means that the application program does not belong to the software support mode.

In one embodiment, the scrolling information includes scrolling parameter, scrolling parameter, The scroll information can be obtained through the positional relationship between the scroll up button 56, the scroll down button 57, the scroll block 51 and the scroll bar 50 and the buttons on the adjustment panel 52 in FIG. 6. The mouse and/or the keyboard are both input devices connected to the user interface synchronous scrolling system 100 for inputting scrolling parameters. For example, a user wants to scroll through a user interface with a mouse and/or keyboard. When the user operates on a certain user interface through a mouse or a keyboard, such as scrolling a certain user interface, the processor 10 uses an input/output device (i.e., a mouse, a button or a keyboard), a bus bar, etc., to receive scrolling parameters from mouse or keyboard input. In one embodiment, the processor 10 receives input and output events through an input-output interface (such as a mouse and/or a keyboard), obtains the handle of the current window, and uses the scrolling value of the scroll wheel (such as mouse wheel) as a parameter for scrolling the window. This parameter can be the aforementioned scrolling parameter. In another embodiment, the processor 10 obtains the scroll position information of the scroll bar of the current window through the GetScrollPos function, and uses the scroll position information as the scrolling parameter. In one embodiment, the scrolling parameter is obtained through the scroll bar 50 and the scroll block 51 in FIG. 6, for example, the scrolling parameter is obtained by obtaining the positional relationship between the scroll block 51 and the scroll bar 50.

In one embodiment, after receiving the scrolling parameter, the processor 10 prompts a monitoring program, an application program (e.g., synchronous scrolling program 30) or a function installed on the operating system related to the scroll bar to perform an action corresponding to the scrolling parameter, For example, the processor 10 lists the scroll bar of the first user interface and the scroll bar of the second user interface. In one embodiment, the monitoring program or function described here can be a background program or a function defined by Microsoft. For example, the EnableScrollBar function enables or disables one or two scroll arrows, the GetScrollBarInfo function captures information about a specified scroll, and the GetScrollInfo function captures scroll parameters, including minimum and maximum scroll positions, page size, and The position of the scroll box (also known as slider, thumb) . . . etc.

For example, the processor 10 opens two Word files, and the two Word files are presented using the first user interface and the second user interface respectively. After receiving the scrolling parameter about the mouse or keyboard, the processor 10 determines that both the application program corresponding to the first user interface and the application program corresponding to the second user interface belong to the software support mode. The processor 10 uses the respective handles of the first user interface and the second user interface through the scrolling parameter (for example, positive 50 scrolls up faster than positive 30, for example, negative 50 scrolls down slower than negative 30), and finds out the corresponding AutomationElement Class and its corresponding window object. The processor 10 uses the AutomationElement Class to find the ScrollBarcontrol component in the AutomationElementCollection, and obtains the attribute of the current ScrollBar. Next, the processor 10 uses the function package to set a synchronous scrolling value for the first user interface or the second user interface respectively, so as to achieve the effect of synchronously scrolling the two Word files.

Similarly, the processor 10 can also open more than two Word files or other Microsoft office files through the scrolling parameter to achieve the effect of scrolling two or more Word files synchronously.

In one embodiment, the processor 10 opens two PDF files, and the two PDF files are presented using the first user interface and the second user interface, The processor 10 determines that neither the application program corresponding to the first user interface nor the application program corresponding to the second user interface belong to the software support mode. The processor 10 obtains a first scroll bar information (ScrollBarInfo) of the first user interface by using the handle of the first user interface and the handle of the second user interface. The processor 10 obtains second scroll bar information of the second user interface. The processor 10 uses a specified scroll bar position function (SetScrollPos) to respectively set the synchronous scrolling value according to the first scroll bar information, the second scroll bar information and the scrolling parameter, so as to scroll the first user interface and the second user interface synchronously.

In one implementation, the processor 10 calls the GetScrollBarInfo function to the operating system through the handle of the first user interface to obtain first scroll bar information of the first user interface. The second scroll bar information is also obtained in the same way. Other windows that are not in software support mode can also obtain scroll bar information through the GetScrollBarInfo function. The processor 10 uses the scroll bar information and the scrolling parameter to achieve the effect of synchronous scrolling.

In one embodiment, the scroll bar information includes information such as the width of the scroll bar, the position of the slider, and the width of the slider.

In one embodiment, the function of specifying the position of the scroll bar is: setting the position of the slider in the specified scroll bar through the function. For example, the scroll bar is required to be redrawn to reflect the new position of the slider in the scroll bar, such positions can be represented by coordinates.

For example, when processor 10 compares and scrolls a PDF file and a Word file synchronously, because the PDF file and the Word file are different application programs (software), the PDF file does not belong to the software support mode, so the built-in synchronization comparison function in Word cannot be used to synchronously scroll the two. Therefore, the processor 10 uses the built-in PDF application program to open the PDF file (i.e., the first user interface), and the PDF file can be arranged horizontally or vertically. Next, the processor 10 uses the built-in Word application program to open the Word file (i.e., the second user interface), and arranges the PDF in the horizontal or vertical direction according to the previous arranged PDF direction. And, through the above-mentioned synchronous scrolling method 200 of the user interface, any scrolling can be done on Word or PDF, and another software will follow the synchronous scrolling. In other words, PDF files and Word files can achieve synchronous scrolling to allow users to compare content.

The above is the corresponding description of FIG. 2, and the following is a more detailed description.

In one embodiment, in step 220, the processor 10 determines that the application program corresponding to the first user interface is a PDF, and the PDF file can be arranged horizontally or vertically, and then step 240 is performed. On the other hand, in step 220, the processor 10 determines that the application program corresponding to the second user interface is Word, and then step 230 is performed. Since steps 230 and 240 have been described in detail above, they will not be repeated here. Thereby, through the above-mentioned synchronous scrolling method 200 of the user interface, any scrolling can be done on Word or PDF, and another software can follow the synchronous scrolling. In other words, PDF files and Word files can achieve synchronous scrolling to allow users to compare content.

Figure 3:
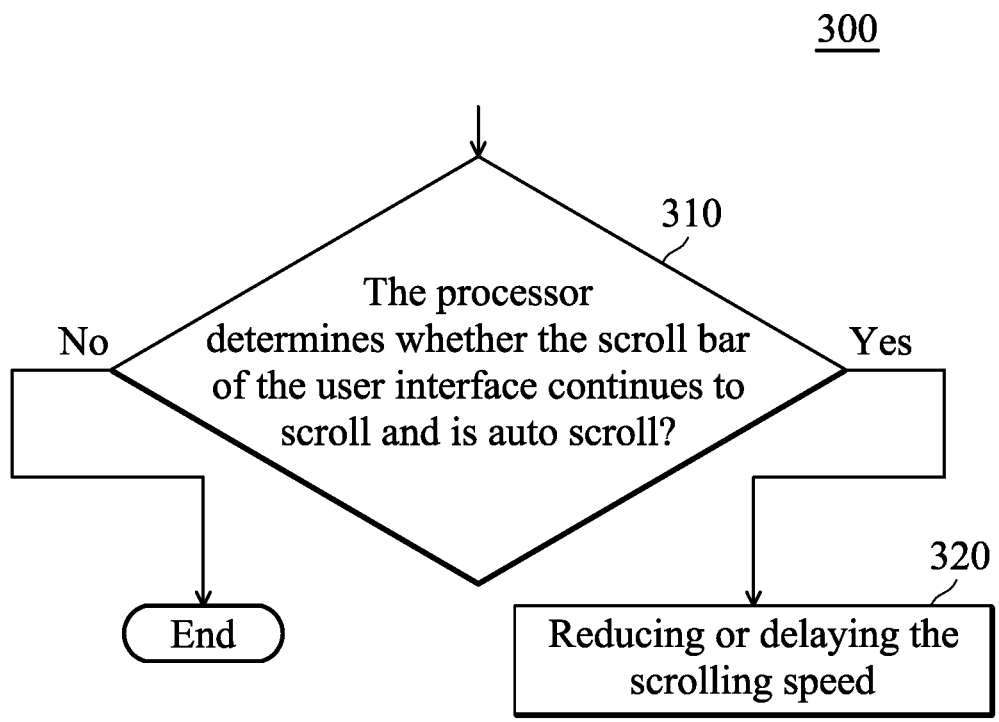
FIG. 3 is a flowchart of a method for determining whether to reduce or delay the scrolling speed in accordance with one embodiment of the present disclosure.

In one embodiment, please refer to FIG. 3. FIG. 3 is a flowchart of a method 300 for determining whether to reduce or delay the scrolling speed in accordance with one embodiment of the present disclosure. The method 300 of determining whether to reduce or delay the scrolling speed can be followed by steps 240 and/or 230.

In step 310, the processor 10 determines whether the scroll bar of the user interface continues to scroll and is auto scroll. In response to the processor 10 determining that the scroll bar of the user interface continues to scroll and is auto scroll, the step 320 is performed. In response to the processor 10 determining that the scroll bar of the user interface does not scroll continuously or is not auto scroll, the process ends.

In step 320, the processor 10 reduces or delays the scrolling speed. Decreasing or delaying the scrolling speed through the processor 10 can allow the screen display speed to keep up with the scrolling speed, and also help to make the scrolling speed of the first user interface and the second user interface consistent.

In one embodiment, the processor 10 reduces or delays the scrolling speed and sets the scrolling parameter.

In one embodiment, the processor 10 can auto scroll the scroll bar of the first user interface and the scroll bar of the second user interface. And, the auto scroll is a scrolling method defined by a scrolling parameter.

In one embodiment, the peripheral device is a mouse or a keyboard.

Figure 4A:
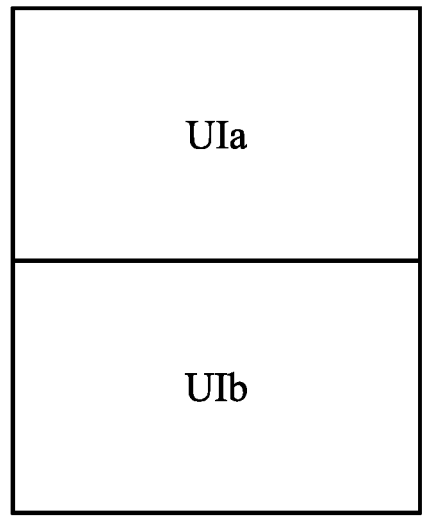
FIGS. 4A-4D are schematic diagrams of a manner of synchronous scrolling two user interfaces and in accordance with one embodiment of the present disclosure.
Figure 4B:
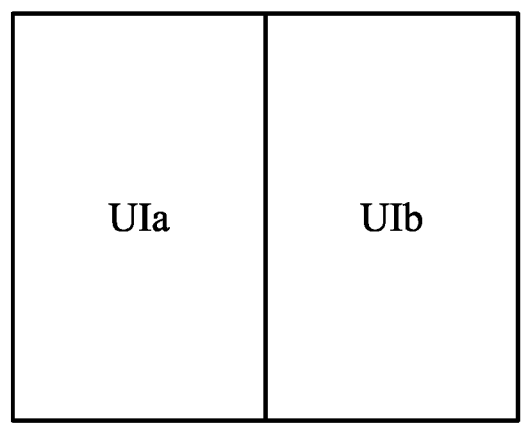
Figure 4C:
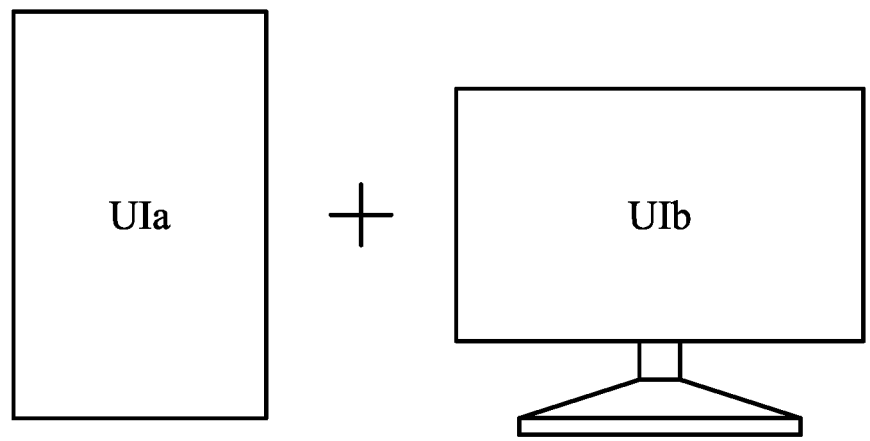
Figure 4D:
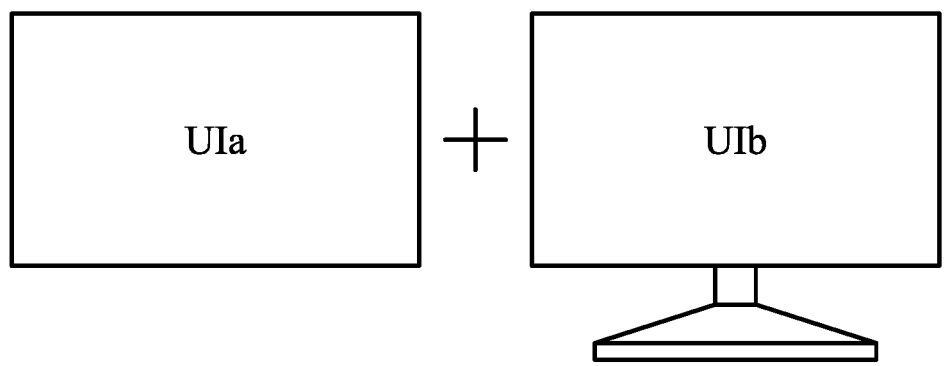

In an embodiment, please refer to FIGS. 4A to 4D. FIGS. 4A to 4D are schematic diagrams of a manner of synchronous scrolling two user interfaces UIa and UIb in accordance with one embodiment of the present disclosure. As shown in FIG. 4A, the way of synchronously scrolling the two user interfaces can be the synchronous scrolling of the vertical screen, As shown in FIG. 4B, the way of synchronously scrolling the two user interfaces can be synchronous scrolling of the horizontal screen, As shown in FIG. 4C, the way of scrolling the two user interfaces synchronously can be the synchronous scrolling of the vertical screen display user interface UIa and the extended screen display user interface UIb. As shown in FIG. 4D, the way of scrolling the two user interfaces synchronously can be the synchronous scrolling of the horizontal screen display user interface UIa and the extended screen display user interface UIb. The present invention is not limited thereto, and these configurations of synchronous scrolling are only examples.

In one embodiment, in response to the first application program and the second application program not belonging to the software support mode, the processor 10 uses the first handle of the first user interface to obtain a first scroll of the first user interface bar information (ScrollBarInfo), and use the second handle of the second user interface to obtain a second scroll bar information of the second user interface.

In one embodiment, the processor 10 checks an attribute in the data structure in the scroll bar information of the user interface corresponding to the application program to determine whether the user interface supports scrolling.

In one embodiment, in response to the processor 10 determining that the user interface supports scrolling, which means that the attribute in the scroll bar information includes scroll information, the processor 10 uses the specified scroll bar position function to set scrolling, so as to synchronous scrolling user interface.

Figure 5:
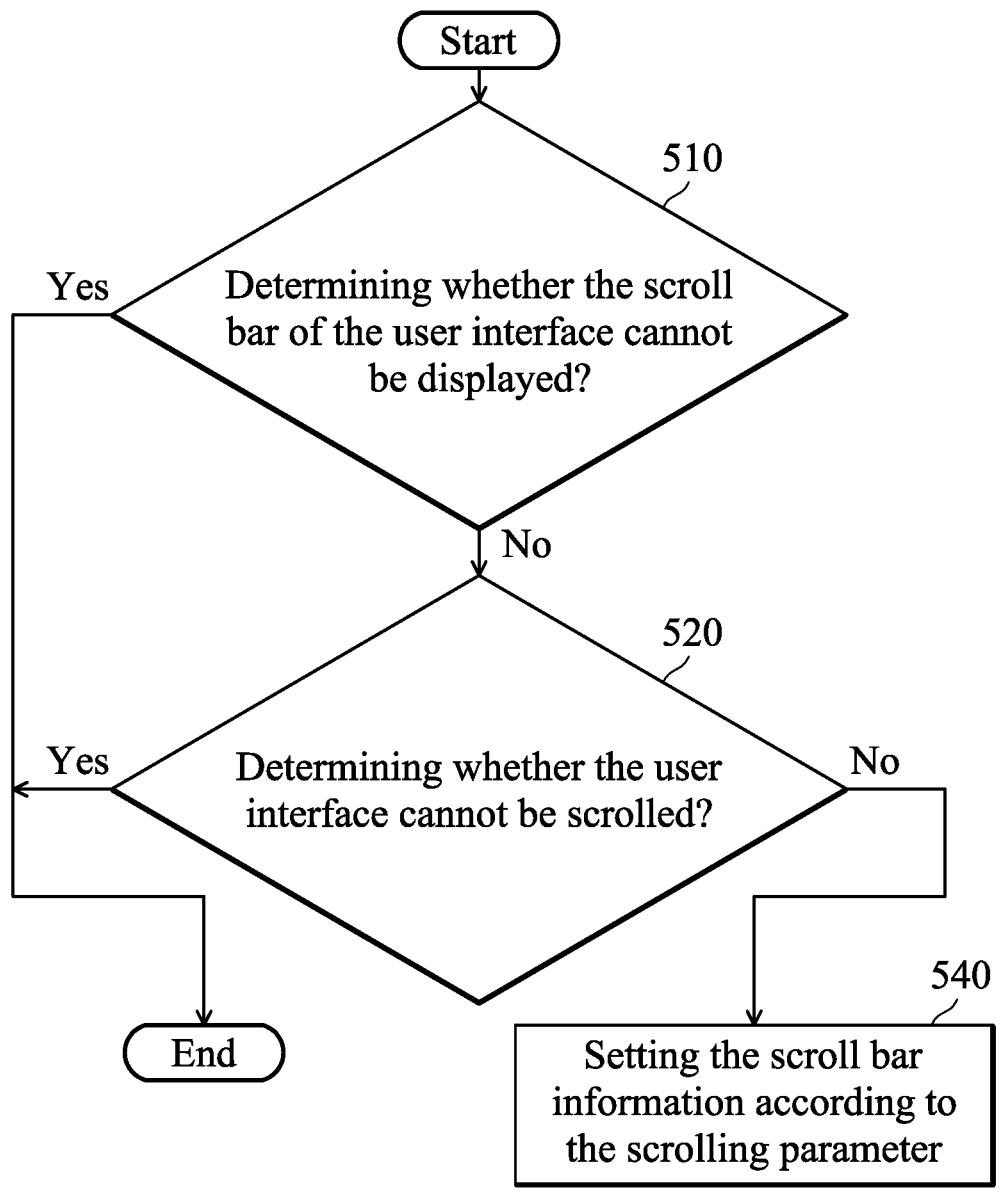
FIG. 5 is a flowchart of a process of determining whether the user interface is scrollable in accordance with one embodiment of the present disclosure.

In one embodiment, please refer to FIG. 5, FIG. 5 is a flowchart of a process of determining whether the user interface is scrollable in accordance with one embodiment of the present disclosure.

In one embodiment, the process of FIG. 5 can be followed by the following steps: the processor 10 checks an attribute in the data structure in the scroll bar information to determine whether the user interface supports scrolling.

In one embodiment, the process of FIG. 5 can be a detailed technical feature of step 240.

In one embodiment, the process of FIG. 5 can be performed after the processor 10 determines that the application program does not belong to a software support mode (i.e., the detailed technical features in step 240). In one embodiment, the processor 10 obtains the scroll bar information of the user interface according to the handle corresponding to the user interface, and further checks whether the attribute in the data structure of the scroll bar information supports scrolling, the processor 10 sets the scroll bar information according to the scrolling parameter. In step 240, after the processor 10 obtains the scroll bar information, the processor 10 further determines the attribute in the data structure, and the processor 10 uses the specified scroll bar position function to set scrolling to synchronously scroll the user interface.

In step 510, the processor 10 determines whether the scroll bar of the user interface cannot be displayed. For example, in some dialog windows, some notification windows or some installation windows, the scroll bar will not be displayed. In one embodiment, the processor 10 can display the register state (the function or parameter name is, for example, rgstate) in the data structure of scroll bar information (for example, the function or parameter name is: scrollbarinfo). The register state contains functions such as STATE_SYSTEM_INVISIBLE (representing the attribute of the scroll bar: hidden), STATE_SYSTEM_UNAVAILABLE (representing the attribute of the scroll bar: unusable).

In response to the processor 10 determining that the scroll bar of the user interface cannot be displayed, the processor 10 considers that synchronous scrolling is not supported, and ends the process of synchronous scrolling.

In one embodiment, the processor 10 determines whether the scroll bar of the user interface cannot be displayed. In response to the processor 10 determining that the scroll bar of the user interface has been displayed, step 520 is performed.

In step 520, the processor 10 determines whether the user interface cannot be scrolled.

In response to the processor 10 determining that the user interface cannot be scrolled, for example, the scroll bar 50 is locked, the processor 10 considers that synchronous scrolling is not supported, and ends the synchronous scrolling process.

In response to the processor 10 determining that the user interface supports scrolling, the process proceeds to step 540. In step 540, the scroll bar information is set according to the scrolling parameter. The processor 10 uses the specified scroll bar position function to set scrolling to synchronously scroll the user interface.

In one embodiment, after step 240, as shown in FIG. 3, in response to the processor 10 determining that the scroll bar of the user interface continues synchronously auto scrolling, the processor 10 reduces or delays the scrolling speed.

In one embodiment, the processor 10 receives input information from an input device (e.g., a mouse and/or a keyboard), For example, the following operations are performed: selecting to use a selection scrolling interface method or a window built-in menu method to synchronously scroll the first user interface and the second user interface.

In one embodiment, please refer to FIG. 6. FIG. 6 is a schematic diagram of selecting a scrolling interface method to synchronously scroll two user interfaces in accordance with one embodiment of the present disclosure. As shown in FIG. 6, the synchronization window position can be selected in the scroll interface UI1 to select the window where the two user interfaces UIa and UIb are placed, for example, for the main screen. The processor 10 can select the first user interface UIa (i.e., the first file to be opened) and the second user interface UIb (i.e., the second file to be opened). The first user interface UIa and the second user interface UIb can also be exchanged up and down through the exchange button SW, and there is a preview screen PR on the left. Next, after pressing the confirm button, the screen UI2 will be opened, and the screen UI2 includes the first user interface UIa, the second user interface UIb, and the scroll bar 50. The scroll bar 50 includes a scroll block 51. By dragging the scroll block 51, the display areas of the first user interface UIa and the second user interface UIb can be adjusted. In one embodiment, the display areas of the first user interface UIa and the second user interface UIb can be adjusted by clicking the scroll up button 56, the scroll down button 57 or dragging the scroll block 51. And, the first user interface UIa and the second user interface UIb are scrolled synchronously. In one embodiment, an adjustment panel 52 is included next to the scroll bar 50, and the adjustment panel 52 includes a move position button 53 (for starting the synchronous scrolling function), a pause/start synchronization button 54 and an end synchronization button 55. Therefore, through the scroll bar 50 and the adjustment panel 52, the first user interface UIa and the second user interface UIb can be scrolled synchronously.

In one embodiment, the processor 10 selects to use the selection scrolling interface method to synchronously scroll the first user interface UIa and the second user interface UIb.

In one embodiment, after selecting the scroll interface method to select the opening of the first application program and the second application program through a selection interface, the processor 10 scrolls the first user interface UIa and the second user interface UIb synchronously through the same scroll bar 50.

In one embodiment, the first application program and the second application program are the same application program, the first application program opens the first user interface UIa, and the second application program opens the second user interface UIb.

Figure 7:
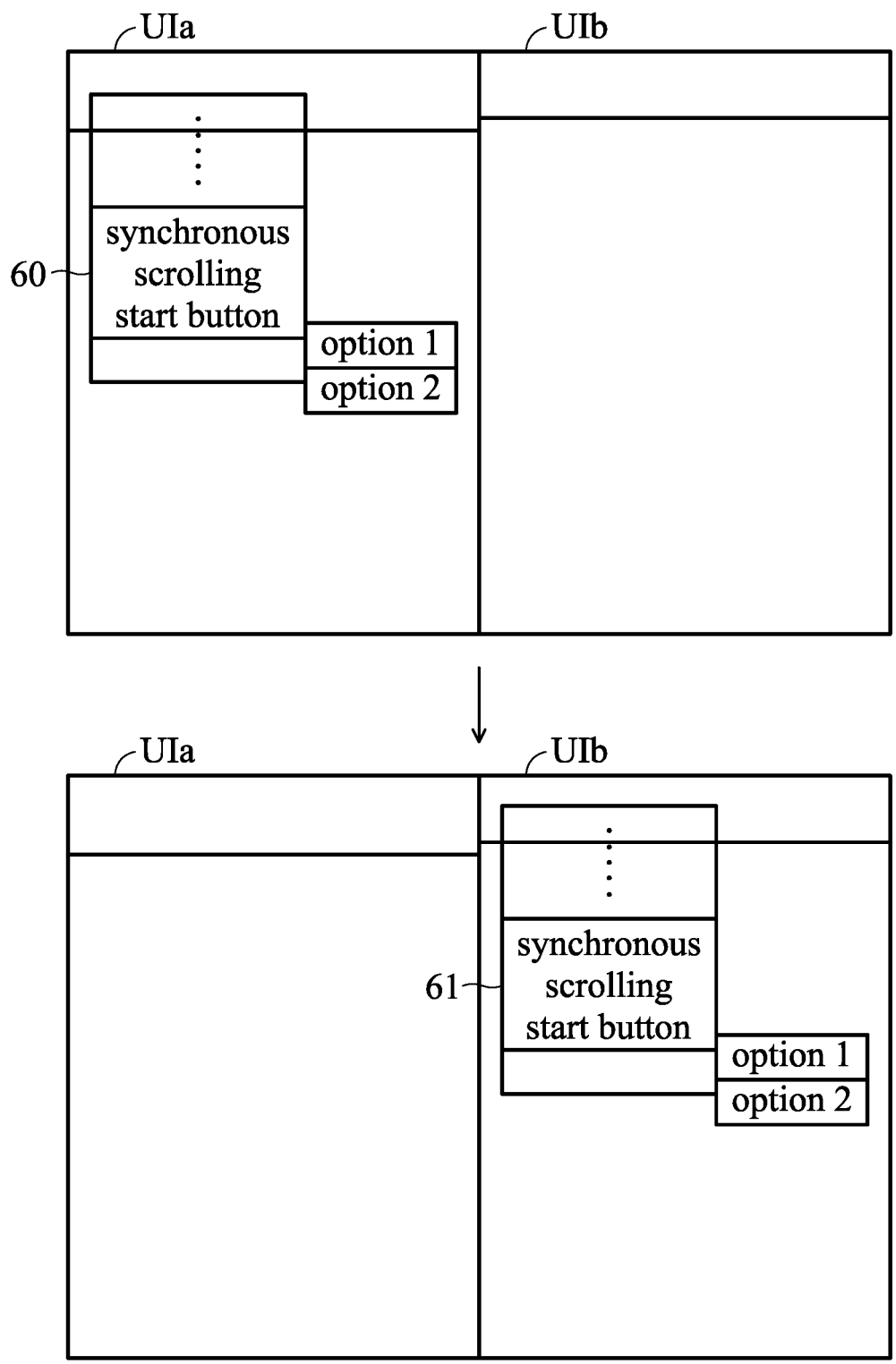
FIG. 7 is a schematic diagram of a window built-in menu method to scroll two user interfaces synchronously in accordance with one embodiment of the present disclosure.

In one embodiment, please refer to FIG. 7. FIG. 7 is a schematic diagram of a window built-in menu method to scroll two user interfaces synchronously in accordance with one embodiment of the present disclosure. In FIG. 7, the processor 10 moves the mouse cursor to the toolbar of the first user interface UIa, selects the synchronous scrolling start button 60, and then selects option 1. Next, the processor 10 moves the mouse cursor to the toolbar of the second user interface UIb, selects the synchronous scrolling start button 61, and then selects option 2. That is, the setting of the two user interfaces UIa and UIb to be synchronized is completed.

In one embodiment, the processor 10 receives input information from an input device (such as a mouse and/or a keyboard), and performs the following operations: using the window built-in menu method to receive a mouse cursor movement signal in the first user interface UIa to obtain the first handle, and then receiving the mouse cursor movement signal in the second user interface UIb to obtain the second handle, The processor 10 receives the mouse scrolling speed signal generated by moving the mouse, and synchronously scrolls the first user interface UIa and the second user interface UIb according to the mouse scrolling speed signal.

In one embodiment, the processor 10 treats the mouse scrolling speed as a scrolling parameter by specifying a scroll bar position function.

In one embodiment, the processor 10 receives input information from an input device, and performs the following operations according to the input information: the processor 10 synchronously scrolls the first user interface UIa and the second user interface UIb by a selected scroll bar 50 in a scrolling interface according to the input information. User interface UIb (as shown in FIG. 6); or the processor 10 obtains the first user interface UIa and the second user interface UIb through a window built-in menu according to the input information, and according to the mouse wheel value, synchronously scrolls the first user interface UIa and the second user interface UIb (as shown in the usage scenario in FIG. 7).

The user interface synchronous scrolling system and user interface synchronous scrolling method described in the invention are applicable to the same type or different types of application programs. The user interface of these application programs can make the content in the window or visual interface scroll synchronously through the user interface synchronous scrolling system and the user interface synchronous scrolling method, so that the user can compare the content more easily. Therefore, the effect of synchronous scrolling is achieved for multiple user interfaces.

The methods of the present disclosure, or specific forms or portions thereof, may exist in the form of code. The code may be contained in physical media, such as floppy disks, optical discs, hard disks, or any other machine-readable (such as computer-readable) storage media, or not limited to external forms of computer program products, where, When the code is loaded and executed by a machine, such as a computer, the machine becomes a device for participating in the present invention. The code may also be transmitted through some transmission medium, such as wire or cable, optical fiber, or any type of transmission, wherein when the code is received, loaded, and executed by a machine, such as a computer, the machine becomes used to participate in this document. invented device. When implemented on a general-purpose processing unit, the code in conjunction with the processing unit provides a unique device that operates similarly to application-specific logic circuits.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A user interface synchronous scrolling system, comprising:
   a processor;
   an input-output interface; and
   a storage device, wherein the processor accesses a synchronous scrolling program stored in the storage device to execute the synchronous scrolling program, wherein the processor executes the following steps:
   opening a plurality of user interfaces;
   obtaining a scrolling parameter through the input-output interface; and
   determining whether each application program corresponding to the user interface belongs to a software support mode, wherein the processor determining whether the application program belongs to the software support mode means determining whether the application program has a component belonging to an AutomationElement Class;
   wherein, in response to the processor determining that the application program belongs to the software support mode, the processor finds a window object belonging to the AutomationElement Class corresponding to the user interface according to a handle corresponding to the user interface, finds a control component according to the window object, sets the control component of the user interface as a synchronous scrolling value according to the scrolling parameter, wherein the AutomationElement Class is a function for representing a UI Automation item in a UI automation tree and containing values that are used as identifiers by UI Automation client applications;
   wherein, in response to the processor determining that the application program does not belong to the software support mode, the processor obtains scroll bar information of the user interface according to the handle corresponding to the user interface, and sets the scroll bar information as the synchronous scrolling value according to the scrolling parameter.

2. The user interface synchronous scrolling system of claim 1, wherein the processor finds the control component of the user interface through the window object, and the control component is a scroll bar.

3. The user interface synchronous scrolling system of claim 1, wherein the processor obtains scroll position information of a scroll bar of a current window, then uses the scroll position information as the scrolling parameter; or
   the processor obtains position relationship of a scroll block and the scroll bar to get the scrolling parameter.

4. The user interface synchronous scrolling system of claim 1, wherein in response to the processor determining that the scroll bar of the user interface continues synchronously auto scrolling, the processor reduces or delays a scrolling speed;
   wherein the processor regards a mouse scrolling speed as the scrolling parameter.

5. The user interface synchronous scrolling system of claim 1, wherein the input-output interface is a mouse or a keyboard; and
   the processor obtains the scrolling parameter through a scrolling value of a mouse wheel or a synchronization button.

6. The user interface synchronous scrolling system of claim 1, wherein the processor determines whether a scroll bar of the user interface is not allowed to be displayed;
   in response to the processor determining that the scroll bar of the user interface is not allowed to be displayed, the processor determines that the user interface does not support synchronous scrolling;

in response to the processor determining that the scroll bar of the user interface has been displayed, the processor determines whether the user interface does not allow scrolling;

in response to the processor determining that the user interface does not allow scrolling, the processor determines that the user interface does not support synchronous scrolling;

in response to the processor determining that the user interface supports scrolling, the processor uses a specified scroll bar position function to set scrolling to synchronously scroll the user interface.

7. The user interface synchronous scrolling system of claim 6, wherein the processor checks an attribute in the data structure in the scroll bar information to determine whether the user interface supports scrolling;

wherein the processor determining that the user interface supports scrolling means that the data structure in the scroll bar information supports scrolling, and the processor uses the specified scroll bar position function to set scrolling to synchronously scroll the user interface.

8. The user interface synchronous scrolling system of claim 1, wherein the processor receives input information from an input device;

wherein, the processor synchronously scrolls a first user interface and a second user interface by a selected scroll bar in a scrolling interface according to the input information; or wherein, the processor obtains the first user interface and the second user interface through a window built-in menu according to the input information, and synchronously scrolls the first user interface and the second user interface according to a mouse wheel value.

9. A user interface synchronous scrolling method, for accessing a synchronous scrolling program stored in a storage device to execute the synchronous scrolling program by a processor, wherein the user interface synchronous scrolling method comprises:

opening a plurality of user interfaces;

obtaining a scrolling parameter through an input-output interface; and determining whether each application program corresponding to the user interface belongs to a software support mode, wherein determining whether the application program belongs to the software support mode means determining whether the application program has a component belonging to an AutomationElement Class;

wherein, in response to the processor determining that the application program belongs to the software support mode, the processor finds a window object belonging to the AutomationElement Class corresponding to the user interface according to a handle corresponding to the user interface, finds a control component according to the window object, and sets the control component of the user interface as a synchronous scrolling value according to the scrolling parameter, wherein the AutomationElement Class is a function for representing a UI Automation item in a UI automation tree and containing values that are used as identifiers by UI Automation client applications;

wherein, in response to the processor determining that the application program does not belong to the software support mode, the processor obtains scroll bar information of the user interface according to the handle corresponding to the user interface, and sets the scroll bar information as the synchronous scrolling value according to the scrolling parameter.

10. The user interface synchronous scrolling method of claim 9, wherein the processor finds the control component of the user interface through the window object, and the control component is a scroll bar.

11. The user interface synchronous scrolling method of claim 9, wherein the processor obtains scroll position information of a scroll bar of a current window, then uses the scroll position information as the scrolling parameter; or the processor obtains position relationship of a scroll block and the scroll bar to get the scrolling parameter.

12. The user interface synchronous scrolling method of claim 9, wherein in response to the processor determining that the scroll bar of the user interface continues synchronously auto scroll, the processor reduces or delays a scrolling speed;

wherein the processor regards a mouse scrolling speed as the scrolling parameter.

13. The user interface synchronous scrolling method of claim 9, wherein the input-output interface is a mouse or a keyboard; and the processor obtains the scrolling parameter through a scrolling value of a mouse wheel or a synchronization button.

14. The user interface synchronous scrolling method of claim 9, further comprising:

determining whether a scroll bar of the user interface is not allowed to be displayed by the processor;

wherein, in response to the processor determining that the scroll bar of the user interface is not allowed to be displayed, the processor determines that the user interface does not support synchronous scrolling;

wherein, in response to the processor determining that the scroll bar of the user interface has been displayed, the processor determines whether the user interface does not allow scrolling;

wherein, in response to the processor determining that the user interface does not allow scrolling, the processor determines that the user interface does not support synchronous scrolling;

wherein, in response to the processor determining that the user interface supports scrolling, the processor uses a specified scroll bar position function to set scrolling to synchronously scroll the user interface.

15. The user interface synchronous scrolling method of claim 14, wherein the processor checks an attribute in the data structure in the scroll bar information to determine whether the user interface supports scrolling;

wherein the processor determining that the user interface supports scrolling means that the data structure in the scroll bar information supports scrolling, and the processor uses the specified scroll bar position function to set scrolling to synchronously scroll the user interface.

16. The user interface synchronous scrolling method of claim 9, further comprising:

receiving input information from an input device by the processor;

wherein, the processor synchronously scrolls a first user interface and a second user interface by a selected scroll bar in a scrolling interface according to the input information; or the processor obtains the first user interface and the second user interface through a window built-in menu according to the input information, and synchronously scrolls the first user interface and the second user interface according to a mouse wheel value.

\* \* \* \* \*